United States Patent [19]
Nguyen et al.

[11] Patent Number: 5,790,518
[45] Date of Patent: Aug. 4, 1998

[54] 1-FOR-N REDUNDANCY IMPLEMENTATION ON MIDPLANE

[75] Inventors: Khai Nguyen, Falls Church, Va.; Larry Belella, Smithsburg, Md.

[73] Assignee: Hughes Electronics Corporation, El Segundo, Calif.

[21] Appl. No.: 577,602

[22] Filed: Dec. 22, 1995

[51] Int. Cl.$^6$ .................................................. H04Q 1/20
[52] U.S. Cl. ............................................ 370/217; 370/360
[58] Field of Search ..................... 370/216, 217, 370/218, 219, 225, 220, 227, 221, 241, 228, 244, 250, 357, 360, 362; 395/180, 181, 182.03, 182.09; 340/825, 825.01

[56] References Cited

U.S. PATENT DOCUMENTS

| | | |
|---|---|---|
| 4,594,704 | 6/1986 | Ollivier .............................. 370/217 |
| 4,700,348 | 10/1987 | Ise et al. ......................... 340/825.01 |
| 4,984,240 | 1/1991 | Keren-Zvi et al. ................. 395/182.02 |
| 5,016,244 | 5/1991 | Massey, Jr. et al. .................... 370/217 |
| 5,345,438 | 9/1994 | Ozaki ................................ 370/220 |
| 5,602,828 | 2/1997 | Engdahl et al. ..................... 370/228 |

*Primary Examiner*—Alpus H. Hsu
*Assistant Examiner*—Kwang B. Yao
*Attorney, Agent, or Firm*—John Whelan; Michael Sales

[57] ABSTRACT

In a switching network, a single 16 slot protective chassis supports a plurality of different adaptation switch modules (ASMs) sharing a single midplane bus. Multiple, identical ASMs form redundancy groups wherein one module in a group operates as a backup. Each ASM has relays for isolation between ASMs, and repeater circuitry to strengthen signals and minimize signal interference.

36 Claims, 7 Drawing Sheets

1-FOR-N REDUNDANCY IMPLEMENTATION ON MIDPLANE

BACKGROUND OF THE INVENTION

In a switching network, such as an asynchronous transfer mode (ATM) switching network, a midplane bus at the periphery of the network serves as the medium for transferring data from the network to external devices. The midplane bus is typically adapted to accept a single protective chassis or module which has 16 slots for individual adaptation switching modules (ASMs). Each slotted ASM is capable of supporting a standard physical interface, and each slot may support an identical or different interface as compared with contiguous slots. There are many standardized physical interfaces which are well-known in the art for connecting to external devices such as computers, modems, and other data communications equipment. Generally, ASMs that support different interfaces cannot share the same environment because the interfaces have different electrical characteristics. Thus, in the prior art, a single protective chassis typically uses only identical adaptation switching modules and therefore can support only one type of interface.

Because backup protection is an important feature for a protective system, redundancy groups have been used in the prior art to prevent a total communication breakdown in the event that an interface should fail. Typically, a secondary, or redundant, ASM circuit has been used as a backup to an identical primary ASM. Ordinarily, it is desirable to reserve some of the slots in the protective chassis for backup modules.

One protective scheme currently used in the art provides protection on a 1-to-1 redundancy basis, meaning one backup secondary module for each primary module. This scheme uses a "Y" cable to feed an electrical signal to two modules in a group. Therefore, if the primary module fails, the connection to the secondary module is already in place. The disadvantages of this method are that only one module will be protected per protective chassis and the cables used are typically cumbersome and costly.

Another prior art protective scheme protects on a 1-for-N basis, meaning one backup for "N" number of modules. In a 16 slot protective chassis, "N" could theoretically be equal to 15, meaning that one secondary module backs up 15 primary modules. This method uses the midplane bus, instead of a "Y" cable feed, as the medium for redundancy traffic. A disadvantage of this method is that only one type of interface can be supported per 16 slot protective chassis, because there is no isolation means to support interfaces with different electrical characteristics.

For the above-described redundancy protection systems, as with most data and communication hardware, there is a premium on increased system flexibility, decreased cost and reduced hardware requirements.

Accordingly, this invention achieves an improved redundancy protection device wherein multiple groups of different interfaces can be supported and protected on a 1-for-N basis, where "N" is greater than 1, in a single protective chassis.

SUMMARY OF THE INVENTION

The foregoing object, along with other features and advantages, is achieved in a single protective chassis using the midplane bus of a switching network, isolation relay devices and repeater circuitry. A single 16 slot chassis supports several groups of adaptation switch modules, of varying types, using relays to isolate the modules. Each group is protected on a 1-for-N basis by the inclusion of an additional module which is identical to the other modules in each group. Each individual module also has repeater circuitry to maintain signal integrity as the signal is passed along the midplane bus.

A protective chassis may be configured in various ways. In the preferred embodiment, ASMs are connected to one another via the relays and the midplane bus. Where modules in a 16 slot chassis belong to different groups, relays isolate the modules to prevent interference between the groups.

Within each interface or redundancy group, the backup module is ideally positioned in the highest numbered slot in the chassis. This allows the backup module to protect the other modules on the most favorable 1-for-N basis. Logic built into the system recognizes when an ASM fails and routes the connection to the backup module.

A redundancy group may be configured with as many modules within a group as a 16 slot chassis will allow. Preferably, the midplane bus will be configured for optimum flexibility depending on the needs of the user. If, for example, the user's system requires four different types of interfaces, the modules could be configured with each interface group having four modules (taking up a total of 16 slots), with one module within each group acting as a backup module. The different groups must be configured such that they are electrically isolated from one another. Logic-controlled relays perform the isolation function, allowing a signal on the midplane bus to bypass an ASM. The repeater circuitry in each ASM group is especially important in maintaining the integrity of an electrical signal that may have to travel a significant distance on the midplane bus to reach each ASM in a group.

The invention, together with further features and attendant advantages, will best be understood by reference to the following detailed description, taken in conjunction with the accompanying drawings.

DETAILED DESCRIPTION OF A PREFERRED EMBODIMENT

Figure 1:
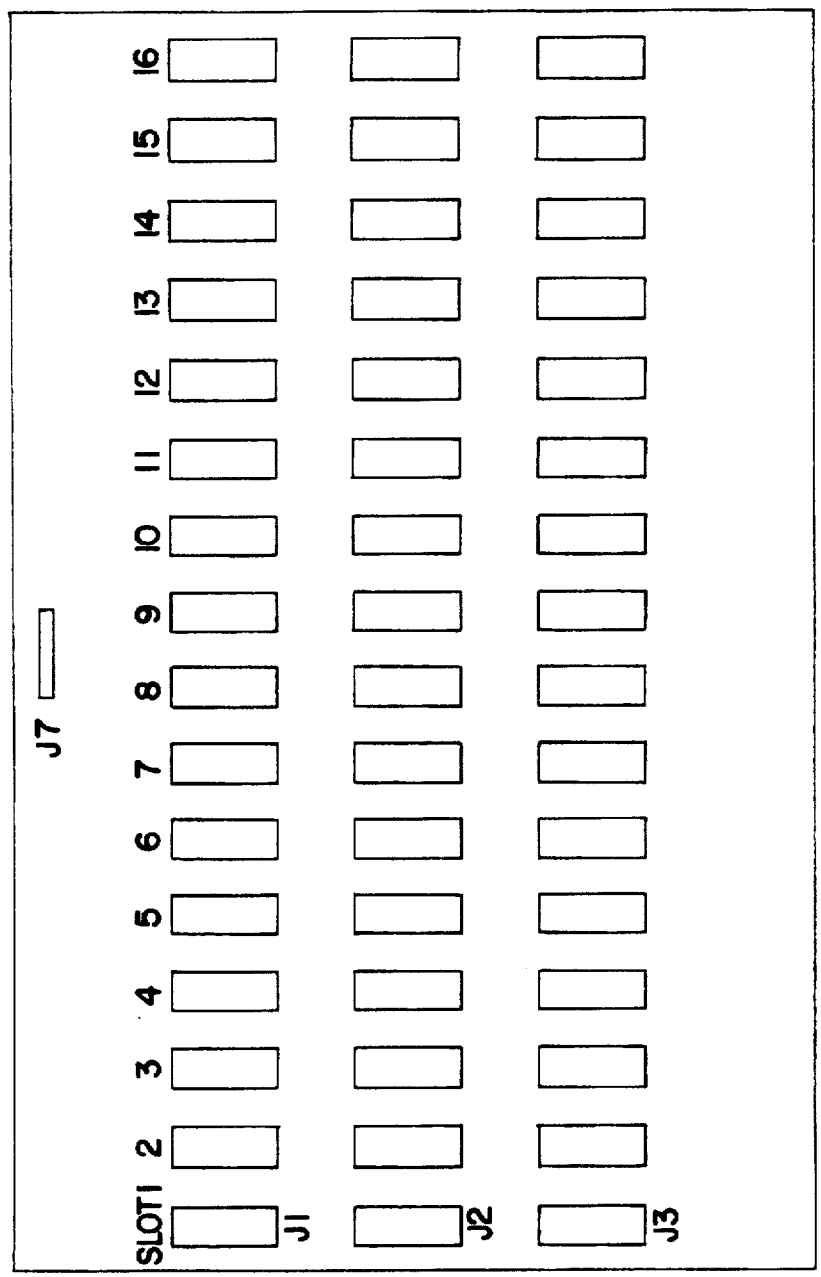
FIG. 1 is a front view illustration of a midplane in an ATM network switch according to a preferred embodiment of the invention.

FIG. 1 is a front view illustration of a midplane in an ATM network switch capable of utilizing the present invention. In the switch shown, hardware modules will be inserted from the front and rear of the chassis. Connectors supporting hardware modules are designated by J1, J2 and J3. For the front of the chassis, slots 8 and 9 are the exclusive slots where switch control modules (SCMs) reside. Slots 1 to 7 and slots 10 to 16 are the universal slots which will be used by the adaptation switch modules (ASMs).

Figure 2:
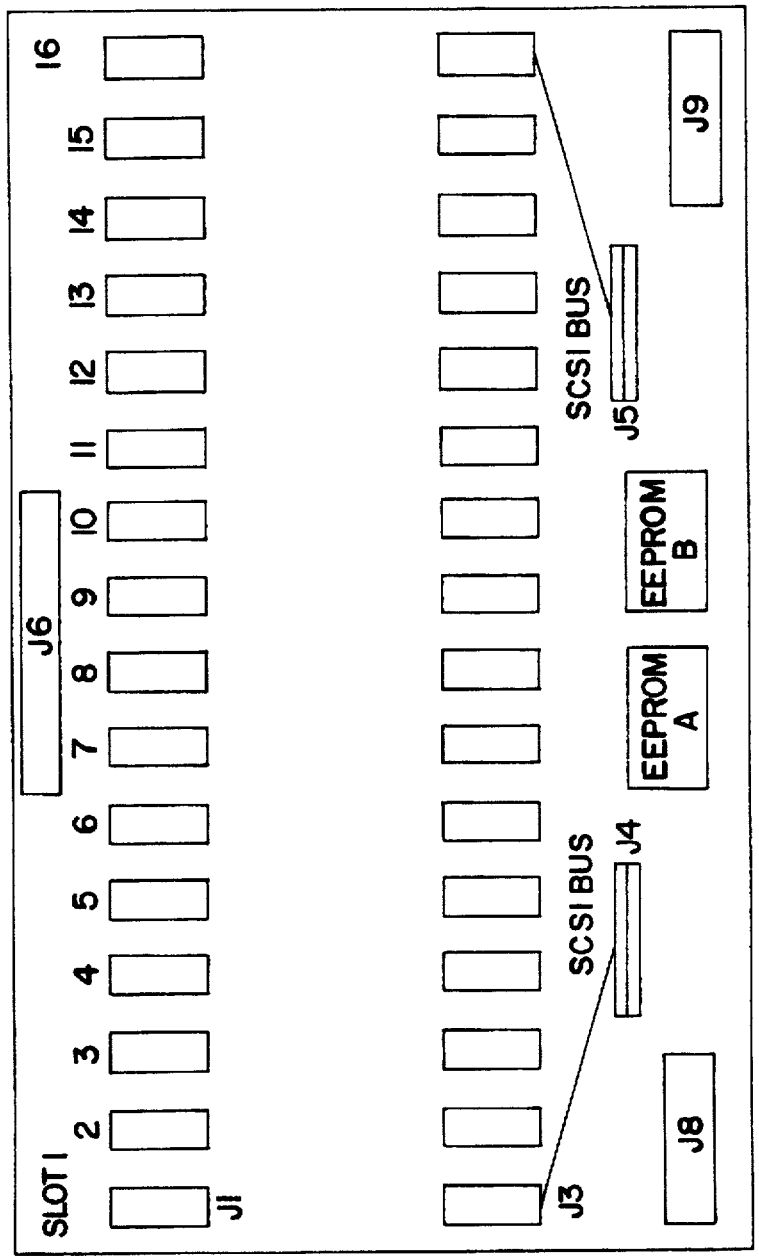
FIG. 2 is a rear view illustration of a midplane in an ATM network switch according to a preferred embodiment of the invention.

FIG. 2 is a rear view illustration of a midplane in an ATM network. For the rear of the chassis, slots 8 and 9 are exclusive slots which can only be occupied by SCM I/O modules. Slots 1 to 7 and slots 10–16 are the universal slots which will be used by the physical interface I/O (PHY) modules. FIGS. 1 and 2 also show connectors J4 and J5 for supporting hardware modules, connectors J8 and J9 for supporting power supply units, connector J6 for supporting a fan tray assembly and connector J7 for supporting system status LEDs. Electronic components such as EEPROMs, resistors (not shown) and capacitors (not shown) serve to provide system identification and to terminate signal lines on the midplane.

Figure 3:
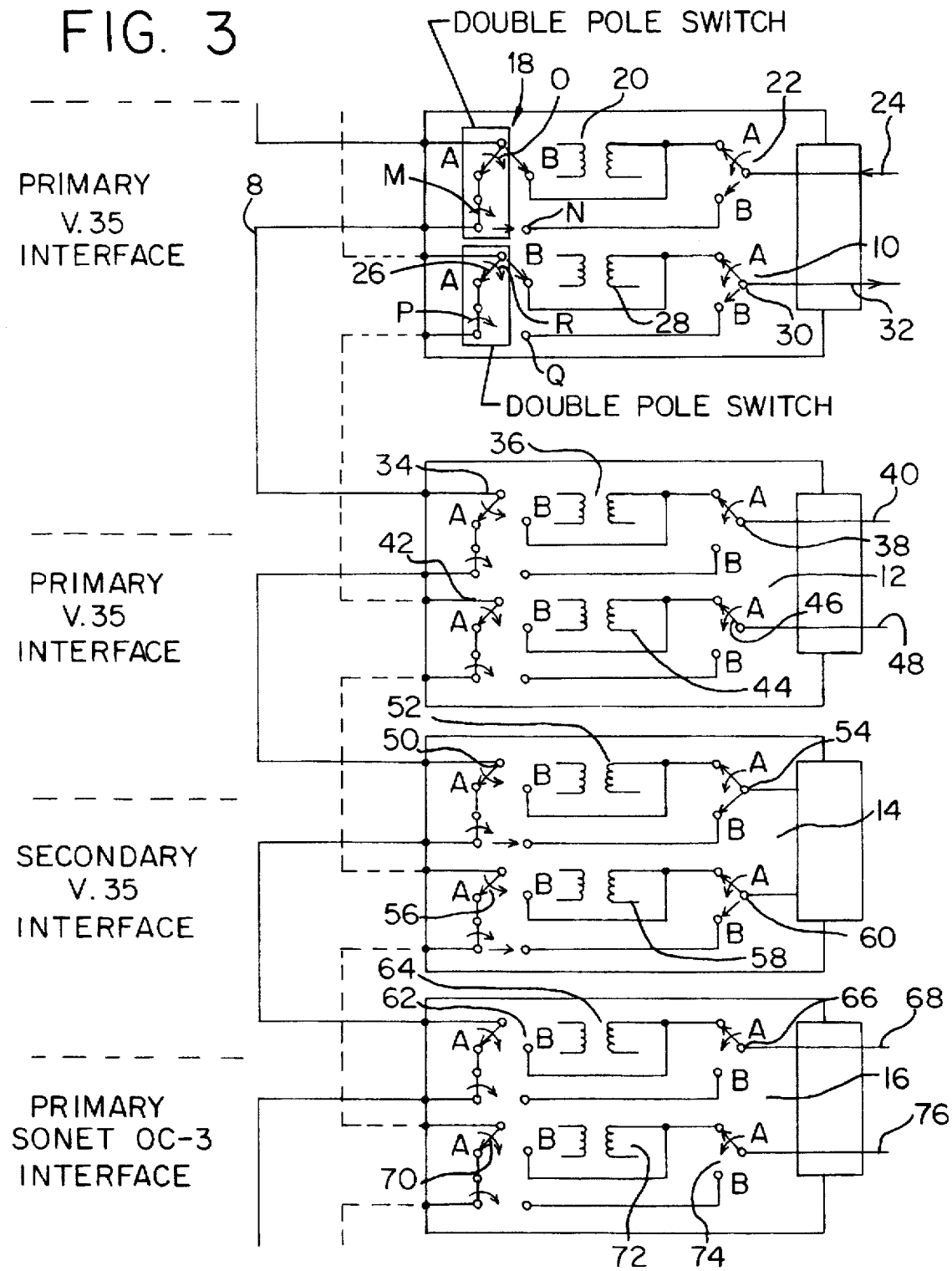
FIG. 3 is a schematic of two ASM groups sharing the same midplane bus, where one ASM group is protected on a 1-N basis, where "N" is greater than 1, according to a preferred embodiment of the invention.

FIG. 3 is a schematic illustrating the redundancy scheme of the present invention. The diagram consists of four adaptation switch modules (ASMs), ASM 10, ASM 12, ASM 14 and ASM 16 all coupled to midplane bus 8. ASM 10, ASM 12 and ASM 14 make up one ASM group, and are labelled in the schematic as V.35 interfaces. ASM 16, part of a second ASM group, is labelled as a Sonet OC-3 interface and is electrically isolated from the other three ASMs by virtue of relay 62 and relay 70 of ASM 16 being in the "A" or isolation position. In the first ASM group, ASM 14 acts as a backup to ASM 10 and ASM 12. The backup secondary ASM 14 must have internal circuitry capable of handling an identical interface as that of the primary modules, ASM 10 and ASM 12.

In accord with the preferred embodiment, the ASMs can represent one of several types of interfaces, including, but not limited to: Sonet OC-3; T3/E3; T1/E1; Serial X21\V.35\RS530; and Ethernet STS-1/Token Ring interface. The different interfaces have different electrical characteristics, typically operate within different voltage ranges, and must be electrically isolated from one another to avoid interference. Thus, for example, since the first ASM group consisting of ASM 10, ASM 12 and ASM 14 represents a V.35 interface group and since the second ASM group, consisting solely of ASM 16, represents a Sonet OC-3 interface group, relay 62 and relay 70 of ASM 16 must remain in the isolation position as shown in FIG. 3 to maintain the integrity of electrical signals passed on the midplane bus 8.

In FIG. 3, ASM 10, labelled in the schematic as a V.35 interface, is a primary interface and has an external connector 24 for accepting electrical signals from an external device (not shown). These signals are passed along a path through relay 22 and either on to the receiver line interface unit 20 or to relay 18. Relay 18 provides a direct path to the midplane bus 8. The receiver line interface unit 20 is the interface between an external device and the ASM processing circuitry (not shown). The transmitter line interface unit 28 is a parallel circuit, transmitting signals from the ASM processing circuitry to a relay 30 and to external connector 32 for connection with external devices. If ASM 10 is not functioning properly, relay 26 provides a direct path to the midplane bus 8, and consequently on to another ASM. The dual relays 18 and 26 of ASM 10 serve primarily to isolate ASM 10 from other ASMs so that signals may travel undisturbed along the midplane bus 8.

ASM 12 is also a primary V.35 interface, having an external connector 40 for accepting electrical signals from external devices. The signals are passed to the receiver line interface unit 36 or to the midplane bus 8, via relay 34, depending on the status of relay 38. The transmitter line interface unit 44 of ASM 12 transmits signals from the particular ASM processing circuitry to external devices via relay 46 and external connector 48. Alternatively, if ASM 12 fails, the signal will be transmitted from the midplane bus 8, through relay 42.

ASM 14, labelled in FIG. 3 as a V.35 interface, acts as a backup, or secondary, to ASM 10 and ASM 12. Because ASM 14 protects two other ASMs, this is the preferred embodiment for a secondary module configuration. ASM 14 has relay 50 and relay 56, both of which, upon failure of ASM 10 or ASM 12, can be moved to the "B" or non-isolation position to couple ASM 14 to the midplane bus 8. Upon closure of relay 50, an electrical path is created from the midplane bus 8 to the receiver line interface unit 52 of ASM 14, and subsequently to the ASM processing circuitry. In the other direction, upon closure of relay 56, an electrical path is created from the transmitter line interface unit 58 through relay 56 to the midplane bus 8. When in the isolation position, relay 54 and relay 60 of ASM 14 provide for the isolation of ASM 14 from external communication devices when ASM 14 is configured as a secondary module. In the non-isolation position, relay 54 provides a direct connection to receiver line interface unit 52 from an external lead (not shown). Similarly, relay 60, in the non-isolation position, will provide a signal path to an external lead (not shown) from transmitter line interface unit 58.

ASM 16 is labelled as a primary Sonet OC-3 interface. As such, it is isolated from the midplane bus 8, and consequently from the three V.35 interfaces: ASM 10, ASM 12 and ASM 14, by virtue of relays 62 and 70 being in the isolation position. External connector 68 provides a path from external devices to the receiver line interface unit 64. Signals from the transmitter line interface unit 72 travel through relay 74 to external connector 76 and back to the external device. If necessary, external lead 68 can be coupled to the midplane bus 8 via relay 66 being in the non-isolation position. Similarly, external lead 76 can be coupled to the midplane bus 8, via relay 74 being in the non-isolation position.

Figure 4:
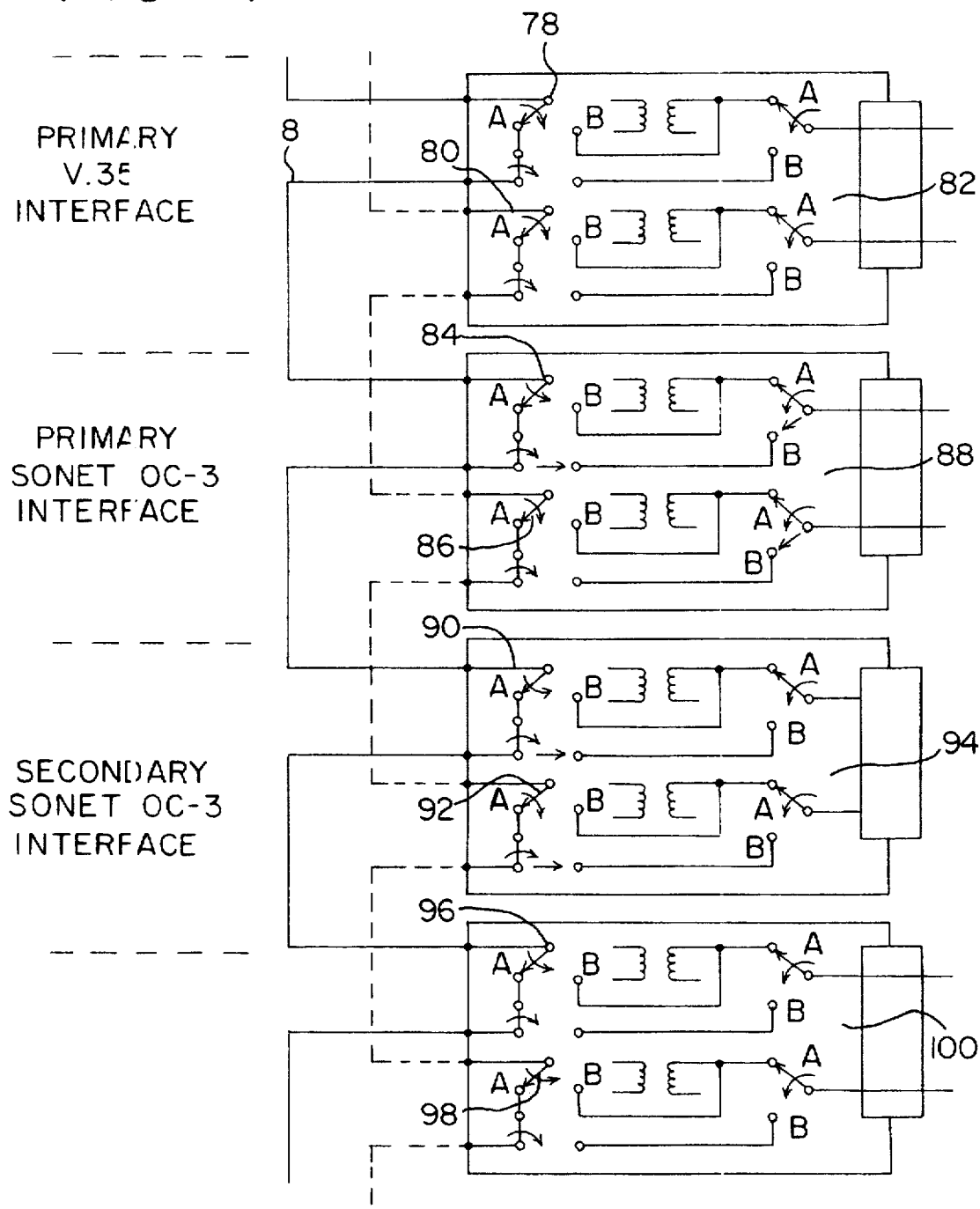
FIG. 4 is a schematic of three ASM groups sharing the same midplane bus according to an alternative embodiment of the invention.

FIG. 4 is an alternative embodiment of the invention. In FIG. 4, there are 3 different ASM groups. The first group consists of one ASM 82, representing a V.35 interface. The second group consisting of ASM 88 and ASM 94 represents a Sonet OC-3 interface group. The third group consists of one ASM 100 representing an Ethernet/Token Ring interface. Each group in FIG. 4 is isolated from the others by virtue of relay 78, relay 80, relay 84, relay 86, relay 90, relay 92, relay 96 and relay 98, all being in the isolation position. Alternatively, each ASM group, if desirable, can be coupled to the midplane bus 8. Particularly, ASM 82 can be coupled to the midplane bus 8 by virtue of relays 78 and 80 being in the non-isolation position; ASM 88 can be coupled to the midplane bus 8 by virtue of relays 84 and 90 being in the non-isolation position; ASM 94 can be coupled to the midplane bus 8 by virtue of relays 90 and 92 being in the non-isolation position; and ASM 100 can be coupled to the midplane bus 8 by virtue of relays 96 and 98 being in the non-isolation position. The second ASM group is the only redundancy group in FIG. 4, protecting on a 1-for-1 basis with ASM 94 serving as the backup for ASM 88. While the configuration of FIG. 4 is a viable alternative, it is not as desirable as the embodiment of FIG. 3 because protection is only on a 1-for-1 basis.

Figure 5:
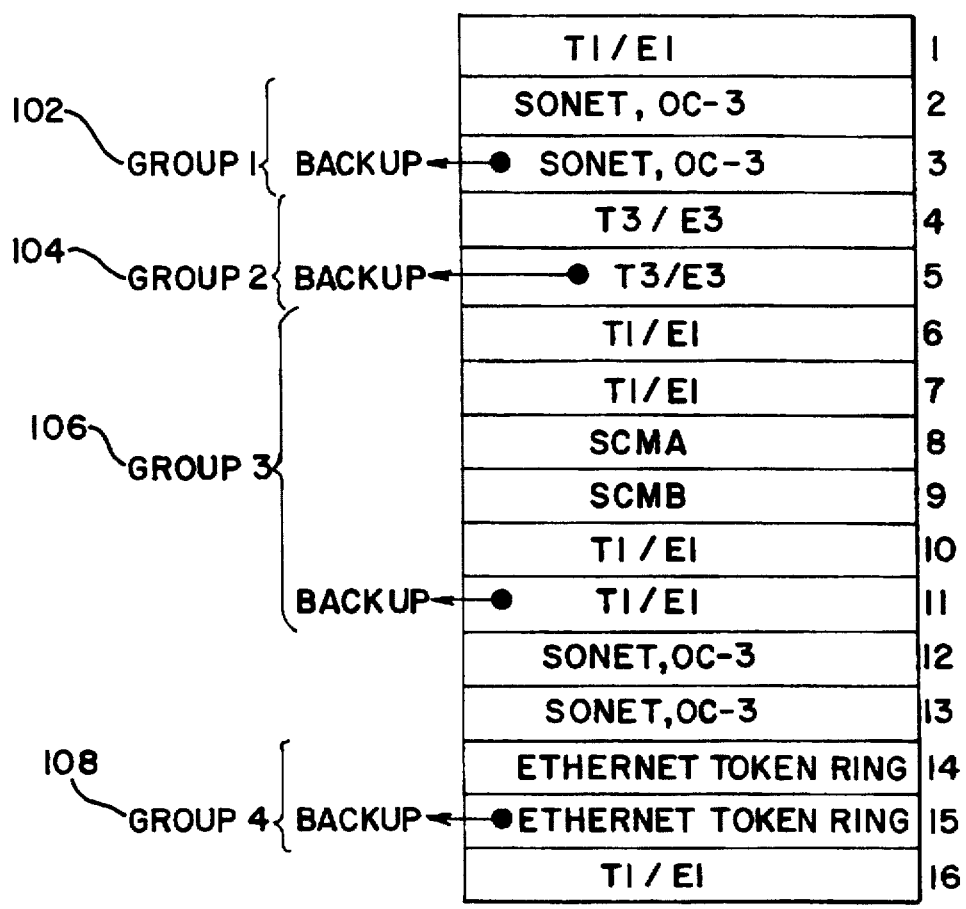
FIG. 5 is an example of a 16 slot protective chassis with four ASM groups, where one ASM group is protected on a 1-N basis, where "N" is greater than 1, according to a preferred embodiment of the invention.

FIG. 5 is an example of a full 16 slot chassis with four ASM redundancy groups. Particularly in FIG. 5, slot 1 has a T1/E1 interface; slots 2 and 3 are Sonet OC-3 interfaces; slots 4 and 5 are T3/E3 interfaces; slots 6 and 7 are T1/E1 interfaces; slots 8 and 9 are switch control modules, SCMA and SCMB respectively; slots 10 and 11 are T1/E1 interfaces; slots 12 and 13 are Sonet OC-3 interfaces; slots 14 and 15 are Ethernet Token Ring interfaces; and slot 16 has a T1/E1 interface.

In accord with the preferred embodiment of the invention, ASM group 106 protects on a 1-for-3 basis and is the most desirably configured group. ASM groups 102, 104 and 108 are protected on a 1-for-1 basis. In these and other embodiments of the invention, the backup ASM module should be placed in the highest numbered slot of those modules in its protection group. Accordingly, the backup module for ASM group 106 is in slot 11 of the protective card, with the primary modules being in slots 6, 7 and 10.

Figure 6:
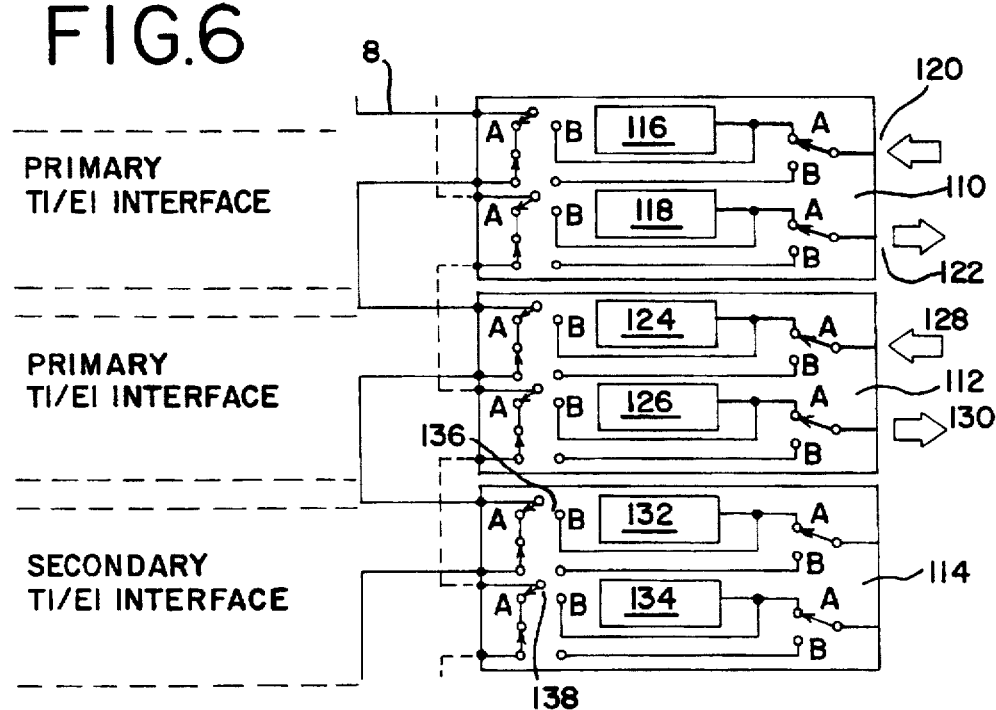
FIG. 6 is a schematic illustrating the signal path in an ASM group when each module is functioning properly.

FIG. 6 is a schematic illustrating the signal path in a T1/E1 interface ASM group when each primary module is functioning properly. In accord with the preferred embodiment, ASM 110 and ASM 112 are primary ASMs protected on a 1-for-2 basis by secondary ASM 114. For ASM 110, FIG. 6 shows that the signal path is from the external connector 120 to the receiver line interface unit 116 in the receiving mode. In the transmitting mode, from ASM 110 to an external device, the signal path is from the transmitter line interface unit 118 to the external connector 122. For primary ASM 112, the signal path is from external connector 128 to receiver line interface unit 124 in the receiving mode; and from transmitter line interface unit 126 in the transmitting mode. Each relay of ASM 110 and ASM 112 is in the "A" or isolation position. Also, both relay 136 and relay 138 of secondary ASM 114 are in the "A", or isolation, position. Therefore, there is no path from the midplane bus 8 to receiver line interface unit 132 and transmitter line interface unit 134.

Figure 7:
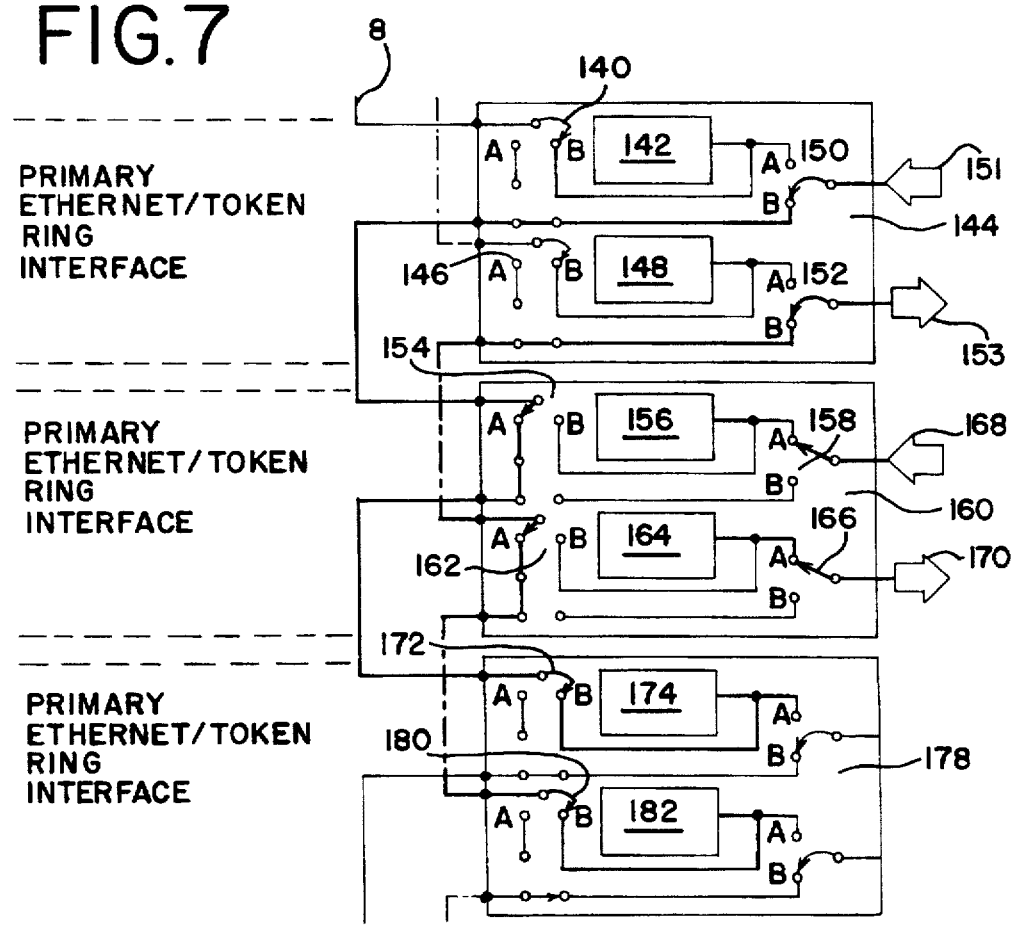
FIG. 7 is a schematic illustrating the signal path in an ASM group where one module is functioning improperly.

FIG. 7 is a schematic illustrating the signal path in an ASM group when a primary module, ASM 144 in this case, malfunctions. For ASM 144, the signal path in the receiving mode is from external connector 151 through relay 150 in the "B" or non-isolation position, to the midplane bus 8, bypassing ASM 160 by virtue of relay 154 being in the isolation mode, through relay 172 in the non-isolation mode, to receiver line interface unit 174 of secondary ASM 178. In the transmitting mode from ASM 178, the signal path starts from transmitter line interface unit 182, through relay 180 in the non-isolation position, on to the midplane bus 8, bypassing ASM 160 by virtue of relay 162 being in the isolation mode, through relay 152 being in the non-isolation position, and finally to external connector 153.

Figure 8:
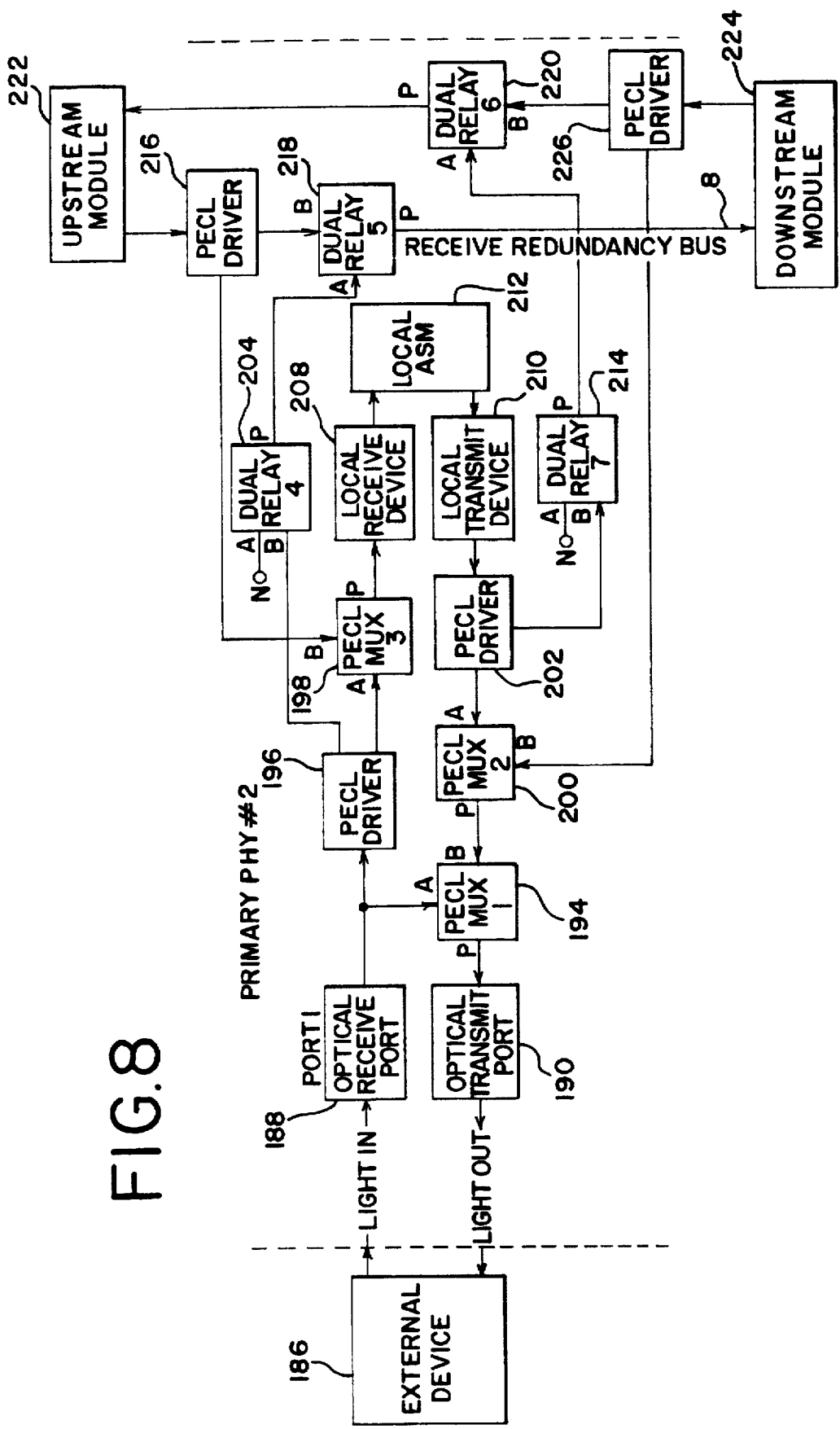
FIG. 8 is a block diagram illustrating the logical operation of an ASM according to a preferred embodiment of the invention.

FIG. 8 is a block diagram illustrating the logical operation of an ASM according to a preferred embodiment of the invention. The primary module 212 in FIG. 8 has an optical receive port 188 for receiving optical signals from an external device. Of course, the type of signal received depends on the type of interface used. Other, non-optical, interfaces may be used and still be within the scope of the present invention.

In the receiving mode, the signal is received from an external device 186 and passed on to a local ASM 212. From the external device 186, the signal is received by an optical receive port 188 and transmitted to a positive emitter coupled logic driver (PECL driver or repeater circuit) 196. The PECL driver 196 strengthens and eliminates noise in the signal picked up from traffic on the midplane 8 or from other upstream ASMs. The strengthened signal is then passed to a PECL multiplexer 198, which receives the externally received signal along with a signal from an upstream ASM 222. The PECL multiplexers typically will accept two pairs of differential signals on the input side and will select one pair to transmit on the output side. Control bits in the signal determine which pair is selected. The signal from upstream ASM 222 also passes through a PECL driver 216. Either the externally received signal or the upstream signal is passed on to a local receive device 208, which processes the signal to conform with the electrical requirements of the local ASM 212. If local ASM 212 is operating as a primary ASM, the signal passed on to the local receive device 208 will be from the external device 186. If local ASM 212 is operating as a secondary ASM, the signal passed on to the local receive device 208 will be from the upstream module 222.

In the transmitting mode, a signal is transmitted from the local ASM 212 to a local transmit device 210. The local transmit device 210 processes the signal to conform with the electrical requirements of the external device 186 and transmits the signal to PECL driver 202. PECL driver 202 strengthens and cleans the signal and passes it to a PECL multiplexer 200 which receives the signal along with a signal from a downstream module 224. The output of the multiplexer 200 is switched based upon whether the local ASM 212 is operating properly or not. If ASM 212 operates properly, the signal at multiplexer 194 will be from ASM 212. If ASM 212 is not operating properly, the signal at multiplexer 194 will be from the downstream module 224. The PECL multiplexer 194 will transmit either the signal received from the PECL multiplexer 200 or the signal from the optical receive port 188, to the optical transmit port 190. The signal from the optical receive port 188 will be selected by PECL multiplexer 194 if the integrity of the port is being tested. In normal operation, PECL multiplexer 194 will transmit the signal received from PECL multiplexer 200. That signal is then transmitted to the external device 186.

Relay 204 and relay 218 provide a path for a signal received from the external device 186 to be passed along the midplane bus 8 to the downstream module 224. Relay 214 and relay 220 provide a path for a signal received from a local ASM 212 to be passed on to the midplane bus 8 to the upstream module 222.

Additional advantages and modifications will readily occur to those skilled in the art. The invention in its broader aspects, is therefore not limited to the specific details, representative apparatus, and illustrative examples shown and described. Various modifications and variations can be made to the present invention without varying from the scope or spirit of the invention, and it is intended that the present invention cover the modifications and variations provided they come within the scope of the appended claims and their equivalents.

What is claimed:

1. For use with a midplane bus, a device comprising:

a first adaptation switch module coupled to the midplane bus and supporting a first interface, the first adaptation switch module including first and second controlled switches for selectively electrically isolating the first adaptation switch module from the midplane bus;

a second adaptation switch module coupled to the midplane bus and supporting a second interface different from the first interface, the second adaptation switch module including third and fourth controlled switches for selectively isolating the second adaptation switch module from the midplane bus; and a third adaptation switch module coupled to the midplane bus and supporting the first interface; the third adaptation switch module having fifth and sixth controlled switches for selectively isolating the third adaptation switch module from the midplane bus;

wherein the first, second, third and fourth controlled switches can selectively electrically connect the first and third adaptation switch modules to the midplane bus to permit the third adaptation switch module to backup the first adaptation switch module while the first and third adaptation switch modules are electrically isolated from the second adaptation switch module.

2. The device of claim 1 wherein the first adaptation switch module further comprises repeater circuitry.

3. The device of claim 1 wherein the second adaptation switch module further comprises repeater circuitry.

4. The device of claim 1 wherein the third adaptation switch module further comprises repeater circuitry.

5. The device of claim 1 wherein the first adaptation switch module further comprises:

a receiver line interface unit, an input for coupling the receiver line interface unit to an external device, and a seventh controlled switch for selectively connecting the input to the midplane bus; and, a transmitter line interface unit, an output for coupling the transmitter line interface unit to an external device; and an eighth controlled switch for selectively connecting the output to the midplane bus.

6. The device of claim 1 wherein the controlled switches comprise relays.

7. The device of claim 1 further comprising a fourth adaptation switch module coupled to the midplane bus and supporting the first interface, the fourth adaptation switch module including ninth and tenth controlled switches for selectively electrically connecting the third and fourth adaptation switch modules, whereby the third adaptation switch module is backup to both the first and the fourth adaptation switch modules.

8. The device of claim 1 wherein, when the first controlled switch provides electrical isolation for the first adaptation switch module from the midplane bus, the first controlled switch closes a first bypass circuit for passing signals along the midplane bus.

9. The device of claim 8 further comprising repeater circuitry to strengthen and filter signals on the first bypass circuit.

10. The device of claim 1 wherein, when the second controlled switch provides electrical isolation for the first adaptation switch module from the midplane bus, the second controlled switch closes a second bypass circuit for passing signals along the midplane bus.

11. The device of claim 10 further comprising repeater circuitry to strengthen and filter signals on the second bypass circuit.

12. The device of claim 1 wherein, when the third controlled switch provides electrical isolation for the second adaptation switch module from the midplane bus, the third controlled switch closes a third bypass circuit for passing signals along the midplane bus.

13. The device of claim 12 further comprising repeater circuitry to strengthen and filter signals on the third bypass circuit.

14. The device of claim 1 wherein, when the fourth controlled switch provides electrical isolation for the second adaptation switch module from the midplane bus, the fourth controlled switch closes a fourth bypass circuit for passing signals along the midplane bus.

15. The device of claim 14 further comprising repeater circuitry to strengthen and filter signals on the fourth bypass circuit.

16. A method for supporting multiple adaptation switch modules on a single midplane bus, comprising the steps of:

coupling a first adaptation switch module supporting a first interface to the midplane bus;

coupling a second adaptation switch module supporting a second interface different from the first interface to the midplane bus;

coupling a third adaptation switch module supporting the first interface to the midplane bus as a backup to the first adaptation switch module; and electrically isolating the second adaptation switch module from the midplane bus at least when the first and third adaptation switch modules are transferring signals therebetween via the midplane bus.

17. The method of claim 16 further comprising the step of strengthening said signals on said midplane bus.

18. The method of claim 16 further comprising the step of reducing noise in the signals.

19. The method of claim 16, further comprising the step of:

coupling a fourth adaptation switch module supporting the first interface to the midplane bus, wherein the third adaptation switch module is backup to both the first and fourth adaptation switch modules.

20. For use with a midplane bus, an adaptation switch module comprising:

a first input for receiving input signals from an external device;

a receiver line interface unit in communication with the first input;

a first controlled switch located to selectively connect the first input with a first output;

a second controlled switch associated with the first output, the second controlled switch comprising a double pole switch having a first pole and a second pole, the first pole of the second controlled switch selectively connecting the first output to the midplane bus and the second pole of the second controlled switch selectively connecting the receiver line interface unit with the midplane bus;

a transmitter line interface unit;

a second output for outputting signals from the transmitter line interface unit to an external device;

a third controlled switch located to selectively connect the second output with a second input; and, a fourth controlled switch associated with the second input for selectively connecting the second input to the midplane bus; wherein the second controlled switch closes a first bypass circuit for passing signals along the midplane bus when the first output is disconnected from the midplane bus, and the fourth controlled switch closes a second bypass circuit for passing signals along the midplane bus when the second input is disconnected from the midplane bus.

21. An adaptation switch module as defined in claim 20 wherein the first, second, third and fourth controlled switches comprise relays.

22. An adaptation switch module as defined in claim 20 wherein the receiver line interface unit comprises a local receive device.

23. An adaptation switch module as defined in claim 20 wherein the transmitter line interface unit comprises a local transmit device.

24. An adaptation switch module as defined in claim 20 wherein the fourth controlled switch comprises a double pole switch, a first pole of the fourth controlled switch selectively connecting the second input to the midplane bus, the second pole of the fourth controlled switch selectively connecting the transmitter line interface unit with the midplane bus.

25. An adaptation switch module as defined in claim 20 further comprising repeater circuitry to strengthen and filter signals on the first bypass circuit.

26. An adaptation switch module as defined in claim 20 further comprising repeater circuitry to strengthen and filter signals on the second bypass circuit.

27. An adaptation switch module as defined in claim 20 wherein the first controlled switch selectively connects the first input with the first output in a first state and connects the first input with the receiver line interface unit in a second state.

28. An adaptation switch module as defined in claim 20 wherein the third controlled switch selectively connects the second output with the second input in a first state and connects the transmitter line interface unit to the second output in a second state.

29. For use with a midplane bus, an adaptation switch module comprising:

a first input for receiving input signals from an external device;

a receiver line interface unit in communication with the first input;

a first controlled switch located to selectively connect the first input with a first output;

a second controlled switch associated with the first output for selectively connecting the first output to the midplane bus;

a transmitter line interface unit;

a second output for outputting signals from the transmitter line interface unit to an external device;

a third controlled switch located to selectively connect the second output with a second input; and, a fourth controlled switch associated with the second input, the fourth controlled switch comprising a double pole switch having a first pole and a second pole, the first pole of the fourth controlled switch selectively connecting the second input to the midplane bus, and the second pole of the fourth controlled switch selectively connecting the transmitter line interface unit with the midplane bus; wherein the second controlled switch closes a first bypass circuit for passing signals along the midplane bus when the first output is disconnected from the midplane bus, and the fourth controlled switch closes a second bypass circuit for passing signals along the midplane bus when the second input is disconnected from the midplane bus.

30. An adaptation switch module as defined in claim 29 wherein the first, second, third and fourth controlled switches comprise relays.

31. An adaptation switch module as defined in claim 29 wherein the receiver line interface unit comprises a local receive device.

32. An adaptation switch module as defined in claim 29 wherein the transmitter line interface unit comprises a local transmit device.

33. An adaptation switch module as defined in claim 29 further comprising repeater circuitry to strengthen and filter signals on the first bypass circuit.

34. An adaptation switch module as defined in claim 29 further comprising repeater circuitry to strengthen and filter signals on the second bypass circuit.

35. An adaptation switch module as defined in claim 29 wherein the first controlled switch selectively connects the first input with the first output in a first state and connects the first input with the receiver line interface unit in a second state.

36. An adaptation switch module as defined in claim 29 wherein the third controlled switch selectively connects the second output with the second input in a first state and connects the transmitter line interface unit to the second output in a second state.

* * * * *